Patented May 6, 1952

UNITED STATES PATENT OFFICE 2,595,735

BASIC ESTERS OF 2,3-DI(4-ALKOXY-PHENYL) - 2 - HYDROXYPROPANOIC ACID

Gino R. Treves, New York, N. Y., assignor to Schieffelin & Co., New York, N. Y., a corporation of New York No Drawing. Application April 28, 1949, Serial No. 90,276

11 Claims. (Cl. 260—473)

This invention relates to dialkylamino alkyl esters of 2,3-di(4-alkoxyphenyl)-2-hydroxypropanoic acid having an alkyl group substituted in at least one of the alkoxyphenyl rings and to acid addition salts of the same. The compounds thus defined have been found to possess desirable properties as local anesthetics.

Structurally, a salt corresponding to the above definition may be represented as follows, the salt being the hydrochloride:

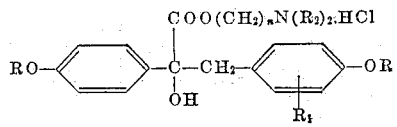

in which R, $R_1$ and $R_2$ are alkyl groups and $n$ is a small whole number such as 1, 2, 3, 4, etc. It may be noted that $R_1$ may be substituted in either or both alkoxyphenyl rings in any unoccupied position. Alkyl groups for R, $R_1$ and $R_2$ may be methyl, ethyl, propyl, butyl, etc., and preferably those containing a small number of carbon atoms, say 1 to 6 carbons. A preferred compound is one in which R, $R_1$ and $R_2$ are methyl and $n$ is equal to 2. Other acid addition salts besides the hydrochloride are the sulfate, nitrate, phosphate, acetate, etc.

The following examples may illustrate the preparation of the new compounds. In each example, each compound whose name is underlined is product resulting from the step or steps described in the paragraph immediately following.

EXAMPLE 1

A. *3-(2-methyl- 4 -methoxyphenyl) -1-(4-methoxyphenyl) -2-propen-1-one*

To a solution of 15.0 gm. of 4-methoxy-2-methylbenzaldehyde and 15.0 gm. of 4-methoxyacetophenone in 40.0 cc. of absolute alcohol, a solution of 1.0 gm. of sodium in 10.0 cc. of methanol is added at room temperature. After standing for 1 hour, a yellow crystalline mass is formed, which is filtered off and recrystallized from ethanol. It melts at 122°–124° C.

B. *3-(2-methyl- 4 - methoxyphenyl) -1-(4-methoxyphenyl) -2,3-epoxypropan-1-one*

Ten grams of the product of step A are dissolved in 100 cc. of a mixture of equal parts of ethanol and acetone at 40° C. To this warm solution 7.5 cc. of 4 N sodium hydroxide and 11 cc. of 30% hydrogen peroxide are added. The mixture is maintained at a temperature between 40° and 50° C. for half an hour. A crystalline material separates which is recrystallized from ethanol. It melts at 61–63° C.

C. *3-(2-methyl-4-methoxyphenyl) - 2 -(4-methoxyphenyl) -2-hydroxypropanoic acid*

A solution of 9.0 gm. of the product of step B in 35 cc. of ethanol is refluxed for 3 hours with 10 cc. of 30% sodium hydroxide solution. The resulting mixture is poured over ice, extracted with ether, the ether removed, and alkaline solution is then separated and acidified with hydrochloric acid. The precipitate obtained is filtered off and recrystallized from ethanol. It melts at 154–155° C.

D. *Hydrochloride of beta-(dimethylamino) ethyl ester of 3-(2-methyl-4-methoxyphenyl) -2-(4-methoxyphenyl) -2-hydroxypropanoic acid*

A solution of 5.3 gm. of the product of step C in 30 cc. of dry isopropyl alcohol is refluxed for 12 hours with beta-chloroethyldimethylamine. The solid material which separates on cooling is filtered off and discarded. The solvent is removed and the residue is washed repeatedly with absolute ether. The solid material formed is dissolved in absolute alcohol from which it crystallizes. It melts at 158–160° C.

EXAMPLE 2

E. *3-(4-methoxyphenyl) - 1 -(2 -methyl-4-methoxyphenyl) -2-propen-1-one*

To a solution of 12.2 gm. 4-methoxy-2-methylacetophenone and 10.6 gm. of 4-methoxybenzaldehyde in 60 cc. of ethanol a solution of 4.5 gm. of sodium in 75 cc. of ethanol is added. The mixture is left at room temperature for 1 hour. The crystalline material which separates melts at 68–69° C.

F. *3 - (4-methoxyphenyl) -1-(2-methyl-4-methoxyphenyl) -2,3-epoxypropan-1-one*

To a solution of 19.0 gm. of the product of step E in 150 cc. ethanol and 65 cc. of acetone at 40° C., 15 cc. of 4 N solution of sodium hydroxide and 23 cc. of 30% hydrogen peroxide is added. The temperature is maintained between 40° and 45° C. for 30 minutes. The mixture is cooled and the crystalline material which separates is recrystallized from ethanol. It melts at 94–96° C.

G. *3 - (4-methoxyphenyl) -2-(2-methyl-4-methoxyphenyl) -2-hydroxypropanoic acid*

A solution of 14.8 gm. of the product of step F in 75 cc. of ethanol is refluxed with 20 cc. of 30% sodium hydroxide solution for 4 hours. The mixture is poured in water and filtered. The alkaline solution is acidified with hydrochloric acid, the precipitate that is formed being then recrystallized from ethanol. It melts at 150–152° C.

H. *Hydrochloride of beta-(dimethylamino)ethyl ester of 3-(4-methoxyphenyl)-2-(2-methyl-4-methoxyphenyl)-2-hydroxypropanoic acid*

A solution of 5.3 gm. of the product of step G in 30 cc. of dry isopropyl alcohol is refluxed for 12 hours with 2.2 gm. of beta-chloroethyldimethylamine. The solid material which separates is filtered off and discarded. Isopropyl alcohol is then removed and the residue extracted repeatedly with anhydrous ether. The solid material formed is recrystallized from absolute ethanol. It melts at 157–158° C.

EXAMPLE 3

I. *3 - (4 - methoxyphenyl)-1-(3-methyl-4-methoxyphenyl)-2-propen-1-one*

To a mixture of 17.5 gm. of 4-methoxy-3-methylacetophenone and 14.5 gm. of 4-methoxybenzaldehyde in 50 cc. of ethanol, a solution of 2.3 gm. of sodium in 50 cc. of ethanol is added. The mixture is left standing for half an hour at room temperature, and then the crystalline material which separates is filtered off and recrystallized from ethanol. It melts at 84–86° C.

J. *3 - (4-methoxyphenyl)-1-(3-methyl-4-methoxyphenyl)-2,3-epoxypropan-1-one*

To 20.0 gm. of the product of step I dissolved in 150 cc. of ethanol and 70 cc. of acetone at 30° C., 15 cc. of 3 N solution of sodium hydroxide and 23 cc. of 30% hydrogen peroxide solution is added. The temperature is maintained between 40° and 45° C. for half an hour. The crystalline material which separates is dissolved in a mixture of ethanol and ethyl acetate. The material which was not soluble is filtered off and discarded. From the mother liquor the epoxide is obtained which melts at 71–73° C.

K. *3 - (4-methoxyphenyl)-2-(3-methyl-4-methoxyphenyl)-2-hydroxypropanoic acid*

A solution of 12.0 gm. of the product of step J in 90 cc. of ethanol is refluxed for 5 hours with 17 cc. of 30% sodium hydroxide. The solution is cooled and filtered, and the filtrate acidified with hydrochloric acid. The precipitate which is formed is then crystallized from methanol. M. P. 149–150° C.

L. *Hydrochloride of beta-(dimethylamino)ethyl ester of 3-(4-methoxyphenyl)-2-(3-methyl-4-methoxyphenyl)-2-hydroxypropanoic acid*

A solution of 7.5 gm. of the product of step K in 35 cc. of dry isopropyl alcohol and 2.2 gm. of beta-chloroethyl-dimethylamine are refluxed for 12 hours. The cooled solution is filtered, the solid material discarded, and the isopropyl alcohol is removed under reduced pressure on a steam bath. The residue is repeatedly washed with anhydrous ether. The solid material which is formed is dissolved in absolute ethanol from which it crystallizes. It melts at 173–174° C.

The compounds identified as D, H, and L in the above examples were tested for their activity as local anesthetics in the eyes of the rabbit, using in each case a concentration of 2% by weight in physiological saline solution. There was a response in each case as follows: with D anesthesia was present in less than 2 minutes and lasted for 60 to 75 minutes; with H anesthesia was present in less than 2 minutes and lasted 18 to 55 minutes; with L anesthesia was also present in less than 2 minutes and was still detectable after 150 minutes. These compounds did not exhibit concurrent mydriatic activity and are thus suitable for use where the simultaneous or concurrent effect of anesthesia and mydriasis is undesirable.

Compounds D, H and L may also be obtained in the form of the free base by treating the acid salt with an alkali such as an aqueous solution of sodium hydroxide, potassium hydroxide, sodium carbonate, etc. Acid salts are preferable over the free bases because of their water solubility.

I claim:

1. A compound from the class consisting of dialkylamino alkyl esters of 2,3-di(4-alkoxyphenyl)-2-hydroxypropanoic acid having an alkyl group in at least one of the alkoxyphenyl rings and acid addition salts of the same, said alkyl groups and alkoxy group having from 1 to 6 carbon atoms.

2. Dialkylamino alkyl esters of 2,3-di(4-alkoxyphenyl)-2-hydroxypropanoic acid having an alkyl group in one of the alkoxyphenyl rings, said alkyl groups and alkoxy group having from 1 to 6 carbon atoms.

3. An acid addition salt of the compound of claim 2.

4. Beta-(dimethylamino)ethyl ester of 2,3-di-(4-methoxyphenyl) - 2 -hydroxypropanoic acid having an alkyl group in one of the methoxyphenyl rings, said alkyl group having from 1 to 6 carbon atoms.

5. An acid addition salt of the compound of claim 4.

6. The hydrochloride of claim 4.

7. Beta-(dimethylamino)ethyl ester of 3-(2-methyl-4-methoxyphenyl) 2-(4-methoxyphenyl)-2-hydroxypropanoic acid.

8. The hydrochloride of beta-(dimethylamino)ethyl ester of 3-(2-methyl-4-methoxyphenyl)-2-(4-methoxyphenyl) - 2 - hydroxypropanoic acid.

9. The hydrochloride of beta-(dimethylamino)ethyl ester of 3-(4-methoxyphenyl)-2-(2-methyl-4-methoxyphenyl) - 2 -hydroxypropanoic acid.

10. Beta-(dimethylamino)ethyl ester of 3-(4-methoxyphenyl)-2-(3-methyl- 4 -methoxyphenyl)-2-hydroxypropanoic acid.

11. The hydrochloride of beta-(dimethylamino)ethyl ester of 3-(4-methoxyphenyl)-2-(3-methyl-4-methoxyphenyl)-2-hydroxy-propanoic acid.

GINO R. TREVES.

REFERENCES CITED

The following references are of record in the file of this patent:

UNITED STATES PATENTS

| Number | Name | Date |
| --- | --- | --- |
| 2,394,770 | Hill et al. | Feb. 12, 1946 |
| 2,399,736 | Holmes et al. | May 7, 1946 |

OTHER REFERENCES

Burtner et al.: J. A. C. S., vol. 65, p. 263 (1943).

Blicke et al.: J. A. C. S., vol. 65, pp. 1967–1970 (1943).